(12) United States Patent
Chukka et al.

(10) Patent No.: US 9,439,092 B1
(45) Date of Patent: Sep. 6, 2016

(54) DETECTION OF COMPONENT FAULT AT CELL TOWERS

(71) Applicant: Sprint Communications Company L.P., Overland Park, KS (US)

(72) Inventors: Chaitanya Chukka, Overland Park, KS (US); Patrick J. Schmidt, Basehor, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/809,654

(22) Filed: Jul. 27, 2015

(51) Int. Cl.
*H04W 24/08* (2009.01)
*H04W 24/02* (2009.01)

(52) U.S. Cl.
CPC ............ *H04W 24/08* (2013.01); *H04W 24/02* (2013.01)

(58) Field of Classification Search
CPC ............ G05D 1/102; B64C 2201/141; B64C 39/024; B64C 2201/125; G06Q 30/0261; G06Q 30/0267; H04W 24/08; H04W 24/02
See application file for complete search history.

(56) References Cited

U.S. PATENT DOCUMENTS

| 4,818,990 | A | | 4/1989 | Fernandes | |
|---|---|---|---|---|---|
| 5,351,032 | A | * | 9/1994 | Latorre | G01S 1/68 340/12.32 |
| 8,154,303 | B2 | * | 4/2012 | Maxson | G01S 19/38 324/528 |
| 2012/0136630 | A1 | | 5/2012 | Murphy et al. | |
| 2012/0250010 | A1 | * | 10/2012 | Hannay | G01N 21/952 356/237.1 |
| 2012/0271461 | A1 | * | 10/2012 | Spata | G01W 1/00 700/276 |
| 2014/0277854 | A1 | * | 9/2014 | Jones | G05D 1/102 701/3 |
| 2015/0236780 | A1 | * | 8/2015 | Jalali | H04B 7/18504 455/13.4 |

* cited by examiner

*Primary Examiner* — Nizar Sivji

(57) ABSTRACT

Systems, methods, and computer-readable media for detecting cell site component faults are provided. An unmanned aerial vehicle may be utilized to collect heat signature information about remotely located cell towers. The heat signature information is analyzed to detect any anomalies at the remote cell site that may indicate an antenna, radio, or cable connector are malfunctioning or need repair, for example. When an anomaly is detected, an indication of the anomaly and information to identify one or more components that correspond to the anomaly are communicated.

17 Claims, 5 Drawing Sheets

DETECTION OF COMPONENT FAULT AT CELL TOWERS

CROSS-REFERENCE TO RELATED APPLICATIONS

Non-applicable.

SUMMARY

There are inherent risks and dangers associated with climbing a cellular tower, as generally performed by human workers to support the operation of vast telecommunications networks. In fact, the U.S. Occupational Safety & Health Administration (O.S.H.A.) has consistently found that cellular tower climbing is an exceptionally dangerous vocation. See, e.g., O.S.H.A. News Release 14-198 NAT, "No More Falling Workers" dated Feb. 11, 2014. In addition, some cellular towers are remote in location, as well, so as to provide expansive and consistent customer service coverage. It is therefore difficult for service providers and maintenance technicians to travel to remote cellular towers that are geographically located far from metropolitan centers. The remote location of such cellular towers makes on-site cellular tower troubleshooting, maintenance, and/or repair of cellular tower components prohibitively expensive. Additionally or alternatively, some cellular towers are placed at physical locations that present a dangerous environment (e.g., wetland, woodland, rocky terrain, steeply sloping terrain, exterior of a high-rise building, hazardous weather condition such as ice accumulation, etc.) for human workers, in conjunction with the inherent climbing risks. Accordingly, there is a significant amount of dangerous work, logistical inefficiency, and cost associated with maintaining and repairing the innumerable cellular towers that support telecommunications networks.

BRIEF DESCRIPTION OF THE DRAWINGS

Illustrative embodiments of the present invention are described in detail below with reference to the attached drawing figures, and wherein.

DETAILED DESCRIPTION

Figure 1:
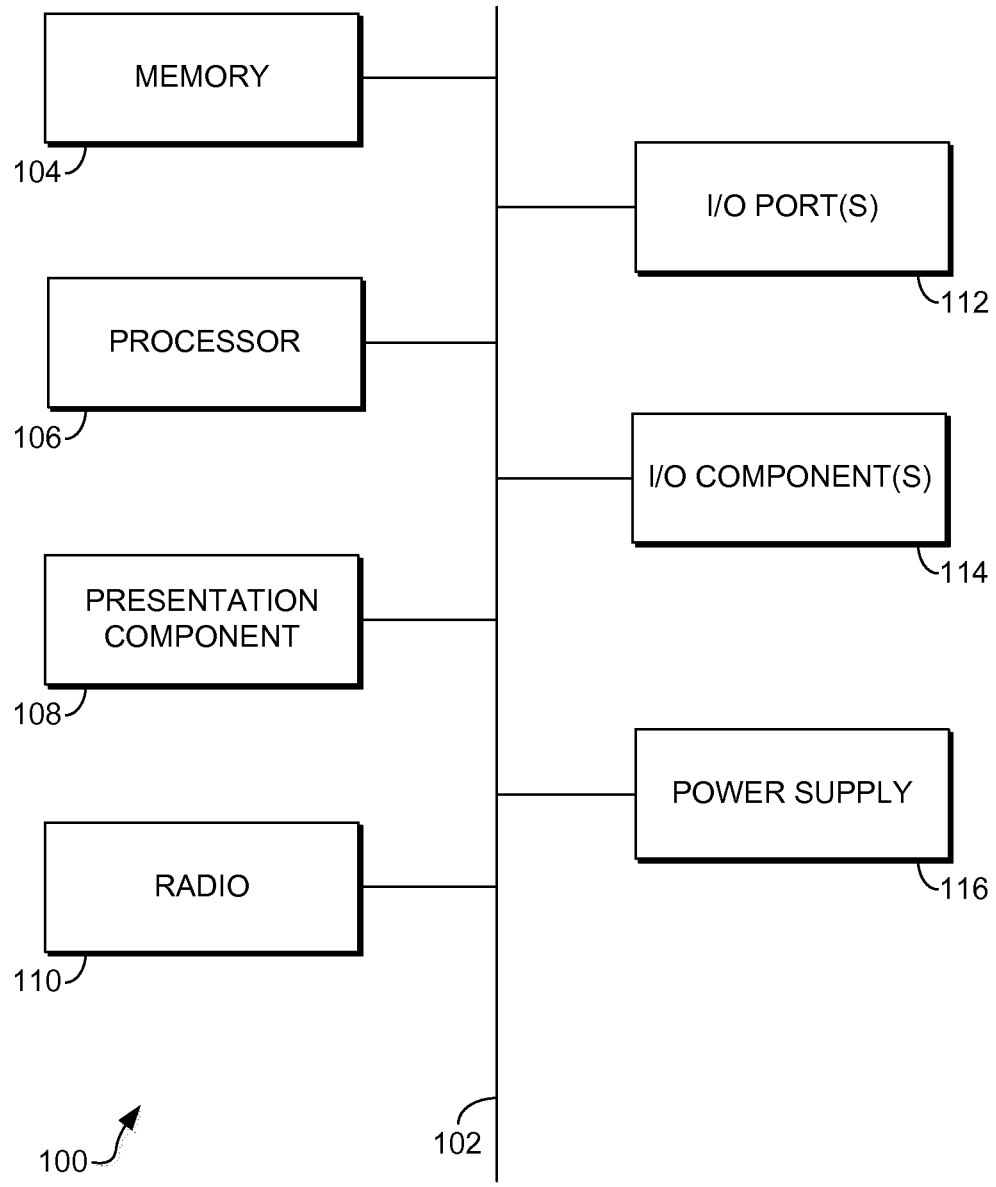
FIG. 1 depicts a generic block diagram of an exemplary computing device in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, and/or combinations of steps similar to those described in this document, in conjunction with other present or future technologies. Thus, although some components may be described or shown as singular, in practice they may be plural. Similarly, although some components or structures may be described or shown as plural in nature, they may be singular or integrated into a single component or a single structure in practice. The description of single or plural elements, being a component, a structure, or otherwise, should not be interpreted as limiting unless and except when explicitly described as a requirement herein. Furthermore, the description of relationships between elements should not be construed as requiring any dependency. Moreover, although the terms "step" and/or "block" may be used to connote different elements of methods employed herein, the terms should not be interpreted as implying any particular order among or between various steps herein disclosed unless and except the order of individual steps is explicitly described.

In general, embodiments described herein relate to the detection of cellular tower components having impaired performance, reduced function, or a full failure that are located at or within a remote cellular tower at a cellular site. As used herein, the term "cell" is used interchangeably with "cellular." The methods and systems described herein provide for the detection of component faults at remotely located cell sites without the need for human workers to physically climb a cell tower. This reduces and/or eliminates said workers' exposure to dangerous or fatal accidents associated with climbing a cell tower at a cell site. Additionally, the reduction in the need for human workers to climb cell towers lowers costs associated with transportation of workers and parts to remote cell site locations.

Embodiments include using an unmanned aerial vehicle (UAV), commonly referred to as a drone, to inspect remote cell sites and collect detailed heat data that indicates an amount of heat emitted (e.g., temperature) by one or more components of a cell tower at the remote cell site. The detailed heat data may be analyzed to detect impaired function of cell tower components such as an antenna, a radio, and/or a connector, also known as a jumper, located on or within the cell tower. Antennae, radios, and cable connectors may be placed at or near the peak of a cell tower. For example, antennae are generally located at or near the peak or other highest point of a cell tower structure. Accordingly, a UAV may be directed to fly around the cell tower, including the peak, in order to detect and collect detailed heat information. The heat data is then analyzed to identify components of the cell tower that are likely to have impaired functionality or poor performance, both of which negatively impact customer's service coverage in the range of the cell tower. The UAV may easily pilot itself around the peak of the cell tower to collect detailed heat data.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
4G Fourth-Generation Cellular Communication System
CD-ROM Compact Disk Read Only Memory
CDMA Code Division Multiple Access
GIS Geographic/Geographical/Geospatial Information System
GPRS General Packet Radio Service GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
PC Personal Computer
PCS Personal Communications Service
PDA Personal Digital Assistant
RAM Random Access Memory
ROM Read Only Memory
TDMA Time Division Multiple Access
UMTS Universal Mobile Telecommunications Systems
RRU Radio Repeater Unit
BST Base Station
eNodeB Evolved Node Base Station
USB Universal Serial Bus
UAV Unmanned Aerial Vehicle
RRC Radio Repeat Controller
MEMS micro-electro-mechanical-systems
Wi-Fi Wireless Fidelity Further, various technical terms may be used throughout this description. An illustrative resource that fleshes out various aspects of these terms can be found in Newton's Telecom Dictionary, 26th Edition (2011).

Embodiments of the technology may be embodied as, among other things, a method, system, or computer-program product. Accordingly, embodiments may take the form of a hardware embodiment, or an embodiment combining software and hardware. Embodiments of the invention may incorporate various computer code or machine-useable instructions, including computer-executable instructions such as program modules, being executed by a computer or other machine, such as a local server, a centralized server, a front-end server, a back-end server, a physical network node, a bridge, a switch, a personal digital assistant (PDA), a wireless device (e.g., smartphone), or other handheld device. Generally, program modules including routines, programs, objects, components, data structures, etc., and refer to code that perform particular tasks or implement particular abstract data types. Embodiments described herein may be practiced in a variety of system configurations, including, but not limited to, handheld devices, consumer electronics, general-purpose computers, specialty computing devices, and the like. Embodiments of the invention may also be practiced in distributed computing environments where tasks are performed by remote processing devices that are linked through a communications network. In a distributed computing environment, program modules may be located in association with local and remote computer storage media including memory storage devices. The computer-useable instructions form an interface to al low a computer to react according to a source of input. The instructions cooperate with other code segments to initiate a variety of tasks in response to data received in conjunction with the source of the received data.

Embodiments of the technology may include, for example, computer-readable media. Computer-readable media may include one or more of volatile and nonvolatile media, removable and non-removable media, and further, may contemplate media readable by a database, a switch, and various other network devices. Network switches, routers, and related components are conventional in nature, as are means of communicating with the same. By way of example and not limitation, computer-readable media comprises computer storage media and communications media.

Computer storage media, or machine-readable media, includes media implemented in any method or technology for storing information. Examples of stored information include computer-useable instructions, data structures, program modules, and other data representations. Computer storage media includes, but is not limited to, Random Access Memory (RAM), Read Only Memory (ROM), Electrically Erasable Programmable Read Only Memory (EEPROM), flash memory or other memory technology, Compact Disc Read Only Memory (CD-ROM), Digital Versatile Discs (DVDs), holographic media or other optical or holographic media; magnetic cassettes, magnetic tape, magnetic disk storage or other magnetic storage devices, carrier wave, or any other medium that can be used to encode the desired information and be accessed by a computing device. These memory components can store data momentarily, temporarily, or permanently. Computer storage media may generally be differentiated from communications media, as computer storage media does not include transitory signals.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, communications media includes wired media such as a wired network or direct-wired connection, and wireless media such as acoustic, infrared, radio, microwave, spread-spectrum, and other wireless media technologies. Combinations of the above are included within the scope of computer-readable media.

In one embodiment, a method for remotely detecting cell site component faults is provided. In embodiments, the method includes receiving heat signature information of a remote cell site collected via an unmanned aerial vehicle. The heat signature information indicates an amount of heat emitted at the remote cell site, in embodiments. The method further includes analyzing the heat signature information to detect an anomaly indicative of a component fault at the remote cell site. In embodiment, the component fault indicates an increased likelihood of impaired functioning of a corresponding component. And, upon detecting the anomaly, the method includes communicating an indication of the anomaly and an identification of a corresponding component.

In another embodiment, one or more computer-readable storage media having computer-executable instructions embodied thereon that, when executed, perform a method for detecting cell site component faults is provided. The computer-readable storage media provides for a method that includes initiating inspection of a cell site by sending instructions for an unmanned aerial vehicle to collect real-time heat signature information that indicates an amount of heat emitted at the cell site, in embodiments. The heat signature information of the cell site is then received, in some embodiments, by a computing device. The heat signature information is analyzed so as to detect one or more anomalies indicative of a component fault at the cell site, in embodiments. In some embodiments, one or more components that correspond to at least one of the one or more anomalies are identified. An alert of an increased likelihood of the component fault of the one or more identified components that correspond to the at least one of the one or more anomalies is communicated, in further embodiments.

In yet another embodiment, a system for detecting a component fault at a remote cell site is provided. The system includes one or more processors and a controller, in embodiments. The controller is configured to receive heat signature information of a remote cell site collected using an unmanned aerial vehicle, in embodiments. In some embodiment, the heat signature information indicates an amount of heat emitted at the remote cell site. The controller is further configured to analyze the heat signature information to detect an anomaly indicative of a component fault at the remote cell site.

Referring initially to FIG. 1, an exemplary computing device for implementing embodiments of the present invention is shown and designated generally as computing device 100. Computing device 100 is but one example of a suitable computing device and is not intended to suggest any limitation as to the scope of use or functionality of the invention. Neither should the computing device 100 be interpreted as having any dependency or requirement relating to any one component or combination of components illustrated. As illustratively shown, computing device 100 includes a bus 102 that directly or indirectly couples the following elements together: memory 104, a processor 106, a presentation component 108, a radio 110, input/output (I/O) port(s) 112, input/output component(s) 114, and a power supply 116. Bus 102 represents what may be one or more busses, such as an address bus, data bus, or combination thereof.

Computing device 100 is a hardware device having memory 104. Exemplary hardware devices include solid-state memory, hard drives, optical-disc drives, etc. Memory includes physical or tangible memory, in embodiments. Memory 104 includes computer-storage media in the form of volatile and/or nonvolatile memory, in some embodiments. The memory may be removable, non-removable, or a combination thereof. Computing device 100 includes one or more processors 106 that read data from various entities such as memory 104 or I/O component(s) 114. Accordingly, processor 106 might actually be multiple processors that receive instructions and process them accordingly. Presentation component 108 presents data indications to a user or other device. Exemplary presentation components include a display device, speaker, printing component, vibrating component, etc. Radio 110 represents a radio that facilitates communication with a wireless telecommunications network. Illustrative wireless telecommunications technologies include Code Division Multiple Access (CDMA), General Packet Radio Service (GPRS), Time Division Multiple Access (TDMA), Global System for Mobile communications (GSM), and the like. In some embodiments, radio 110 might also facilitate other types of wireless communications including Wireless Fidelity (Wi-Fi) communications and Geographic/Geographical/Geospatial Information System (GIS) communications. The radio 110 may include a transmitter and/or a receiver. In addition, a transmitter and a receiver may be integrated into a transceiver, in some embodiments. I/O port(s) 112 allow computing device 100 to be logically coupled to other devices including I/O component(s) 114, some of which may be built into or integrated with the computing device 100. Illustrative I/O component(s) include a Universal Serial Bus (USB) jack, stereo jack, infrared port, proprietary communications port (s), satellite dish, keyboard, touchscreen, sensor(s), micro-electro-mechanical-systems (MEMS) devices, microphone, scanner, printer, wireless device, and any other item usable to directly or indirectly input data into computing device 100. In one embodiment, I/O component(s) 114 include a motherboard disk-controller capable of communicating with a single enclosure containing multiple memory devices. Power supply 116 includes items such as batteries, fuel cells, power-grid connections, or any other component that can act as a power source to power computing device 100.

Continuing, computing device 100 typically includes a variety of computer-readable media, as described previously herein. Computer-readable media includes media implemented in any non-transitory way for storing information. Examples of stored information include computer-useable instructions, data structures, program modules, and other data representations. As indicated above with respect to memory 104, media examples include RAM, ROM, EEPROM, CDROM, DVD, and the like, as well as a carrier wave or any other medium that can be used to encode desired information and be accessed by computing device 100.

Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Figure 2:
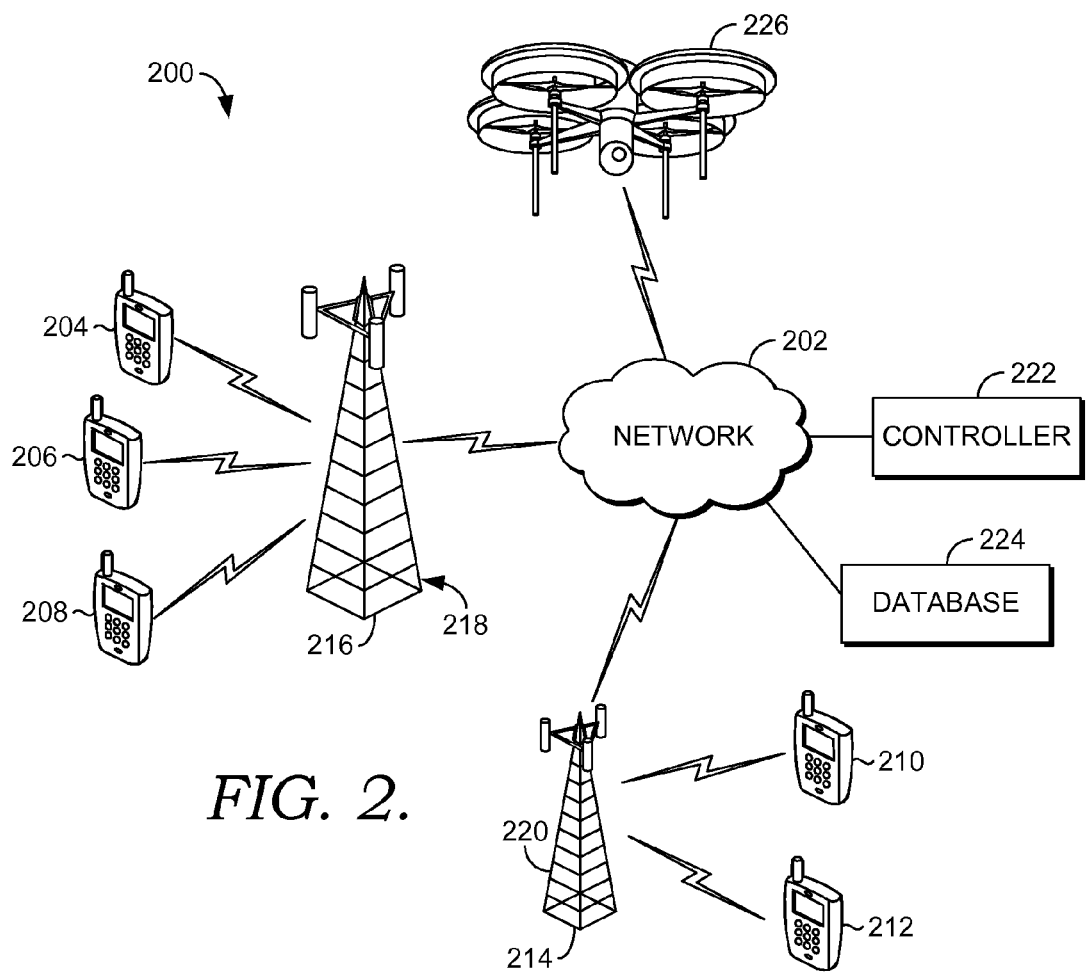
FIG. 2 illustrates an exemplary telecommunications environment suitable for use in implementing embodiments of the present invention.

FIG. 2 depicts an illustrative telecommunications environment including a network in accordance with embodiments of the invention. Telecommunications environment 200 is merely an example of one suitable operating environment and is not intended to suggest any limitation as to the scope of use or functionality of embodiments of the present invention. For instance, a network 202 within the telecommunications environment 200 illustrated may operate using a specified technology, such as GSM, CDMA, Wide Area Network (WAN), Wi-Fi, Worldwide Interoperability for Microwave Access (WiMAX), Long Term Evolution (LTE), LTE Advanced, Evolution Data Optimized (EVDO), high rate packet data (HRPD), evolved high rate packet data (eHRPD), and the like. These technologies are listed for exemplary purposes only and are not meant to limit the scope of the present invention. In one embodiment, the telecommunications environment 200 of FIG. 2 operates using LTE technology, but may also operate using other technologies as well. Additionally, the telecommunications environment 200 may comprise one or more of the components illustrated in FIG. 1. In embodiments, the telecommunications environment 200 includes one or more base transceiver stations (BST), radio network controllers (RNC), gateways, servers, satellites, and the like. Not all components that make up the telecommunications environment 200 and the network 202 therein are shown in exemplary FIG. 2.

As depicted in FIG. 2, the telecommunications environment 200 includes the network 202. The network 202 is communicatively coupled to user equipment such as user devices 204, 206, 208, 210, and 212, cell sites 214 and 216 including base stations and corresponding cell towers 218 and 220, a controller 222 and a database 224. Further, the network 202 is communicatively coupled to an unmanned aerial vehicle (UAV) 226. The network 202 enables wireless communications (e.g., telephone calls, VoIP, text messages, SMS messages, data, etc.) to be sent from and received by user devices 204, 206, 208, 210, and 212 using base stations and corresponding cell towers 218 and 220 located at the cell sites 214 and 216. In embodiments, the network 202 is configured to facilitate communication of the cell sites 214 and 216 using the network 202. In some embodiments, the network 202 facilitates an interface between wireless communications between cell sites 214 and 216 and back-end components of the network 202, including hard-wired components such as the controller 222 and the database 224. As such, communication is enabled using back-end components (e.g., servers) and cell sites (e.g., 214 and 216) that support communications from one user equipment (e.g., user device 204) to another user equipment (e.g., user device 210) via the network 202.

User devices 204, 206, 208, 210, and 212 include user equipment such as cellular phones, tablet computers, personal computing devices, wireless-capable game consoles, smart watches, and the like, for example. These exemplary devices are illustrative and should not be construed as limiting as other devices are contemplated to be within the scope of this disclosure. In embodiments, the user devices 204, 206, 208, 210, and 212 are devices capable of wireless communication. The user devices 204, 206, 208, 210, and 212 are generally configured to at least provide a user access to services over the network 202 such as cellular telephone services, messaging, and data (e.g., Internet), for example. The user devices 204, 206, 208, 210, and 212 connect to the network 202 using cell sites 214 and 216.

The UAV 226 is an aerial vehicle capable of piloting itself. The UAV 226 may include one or more cameras, sensors, or other equipment that may be used to aerially inspect and collect information regarding cell sites. Exemplary UAVs include a quad copter, Scan Eagle®, Raven, WASP III, Shadow, and a Fire Scout, each of which are more commonly known as "drones." Other types of UAVs are contemplated to be within the scope of this disclosure and the exemplary drones listed herein should not be construed as limiting the present invention. The use of the UAV 226 to inspect remote cell sites provides a safe alternative to human workers physically scaling cell towers of remote cell sites. The UAV 226 aerial inspection enables maintenance of cell sites with greatly reduced risk to human workers.

Cell sites 214 and 216 are physical locations that include telecommunications equipment and/or devices. Equipment and/or devices may generally be located within a structure such as a cell tower. The equipment and/or devices at the cell tower support network service(s) to one or more user devices that are located within a service coverage area of the cell tower. The service coverage area corresponds to an area that is located close to (e.g., proximate) the physical location of the cell site itself, in embodiments. For example, a service coverage area of a cell site may include an area having a radius of several miles surrounding the cell site and the telecommunications equipment therein. In further embodiments, when user equipment is within the service coverage area of a cell site, the strength of a network service signal created or cast from the cell site may be strongest when the user equipment is located close to the cell site, and the network signal may be weaker as the user equipment is distanced from the cell site. The distance may be measured in a scale based on miles or kilometers, typically. The service coverage area of a cell site may also be referred to as the range of said cell site, in embodiments. In one embodiment, one or more of the cell sites 214 and 216 are BSTs. In a further embodiment, one or more of the cell sites 214 and 216 are an eNodeB. Generally, each of the cell sites 214 and 216 includes a cell tower having at least one antenna, at least one radio, and at least one connector cable, also known commonly as a jumper, that connects the antenna and radio to one another.

In embodiments, the network 202 includes a controller 222. The controller 222 may be configured to perform various functions, including exemplary methods described hereinafter. In embodiments, the controller 222 may be configured to receive heat signature information of a remote cell site collected using an UAV. The heat signature information may indicate an amount of heat emitted at a remote cell site, such as cell sites 214 and 216, for example. The controller 222 is further configured to analyze the heat signature information to detect an anomaly indicative of a component fault at the remote cell site, in embodiments. As used herein, a component fault refers to impaired functioning of a component at a cell tower. The network 202 may further include and/or be communicatively coupled to a database 224. The database 224 may be configured to store a plurality of heat signature information and/or sets thereof that describe heat emitted at one or more of a plurality of cell sites, such as cell sites 214 and 216. The stored heat signature information may include standard heat signature information that describes at least one predefined operating temperature of a cell site component, such as an antenna, radio, or cable connector. Standard heat signature information may refer to a single set of heat measurements corresponding to a single cell tower of a cell site, in some embodiments. Standard heat signature information may refer to a single set of heat signature information formed by averaging multiple heat measurements corresponding to more than one cell tower and/or more than one cell site, in some embodiments.

In embodiments, the controller 222 may reference heat signature information stored in the database 224. The controller 222 may use referenced heat signature information when detecting anomalies in the heat signature data of a cell site. As such, the controller 222 may identify a first anomaly corresponding to a first component having a heat measurement outside of a defined operating temperature, in embodiments. Upon finding an anomaly based on the analysis, the controller 222 may further be configured to communicate an indication of a maintenance action upon detection of the anomaly, as will be described in detail herein. In embodiments, an indication of a maintenance action may identify a component fault corresponding to at least one component having a likelihood of impaired function which the maintenance action rectifies. In some embodiments, an indication of a maintenance action may include an instruction or directive to a computing device that may be undertaken to address the anomaly. In other embodiments, an indication of a maintenance action may include an instruction or directive to a technician, via a computing device, that may be undertaken to address the anomaly. Instructions or directives may include identifiers of one or more components that correspond to a detected anomaly, a type of component fault (e.g., power failure, high heat emission, low heat emission, lack of heat emission), a type of component (e.g., antenna, radio, cable connector) corresponding to a detected anomaly, identifiers of other components that may be affected by the components corresponding to a component fault (e.g., a radio corresponding to a detected anomaly may affect an antenna associated with or communicatively connected to the radio), and the like.

Figure 3:
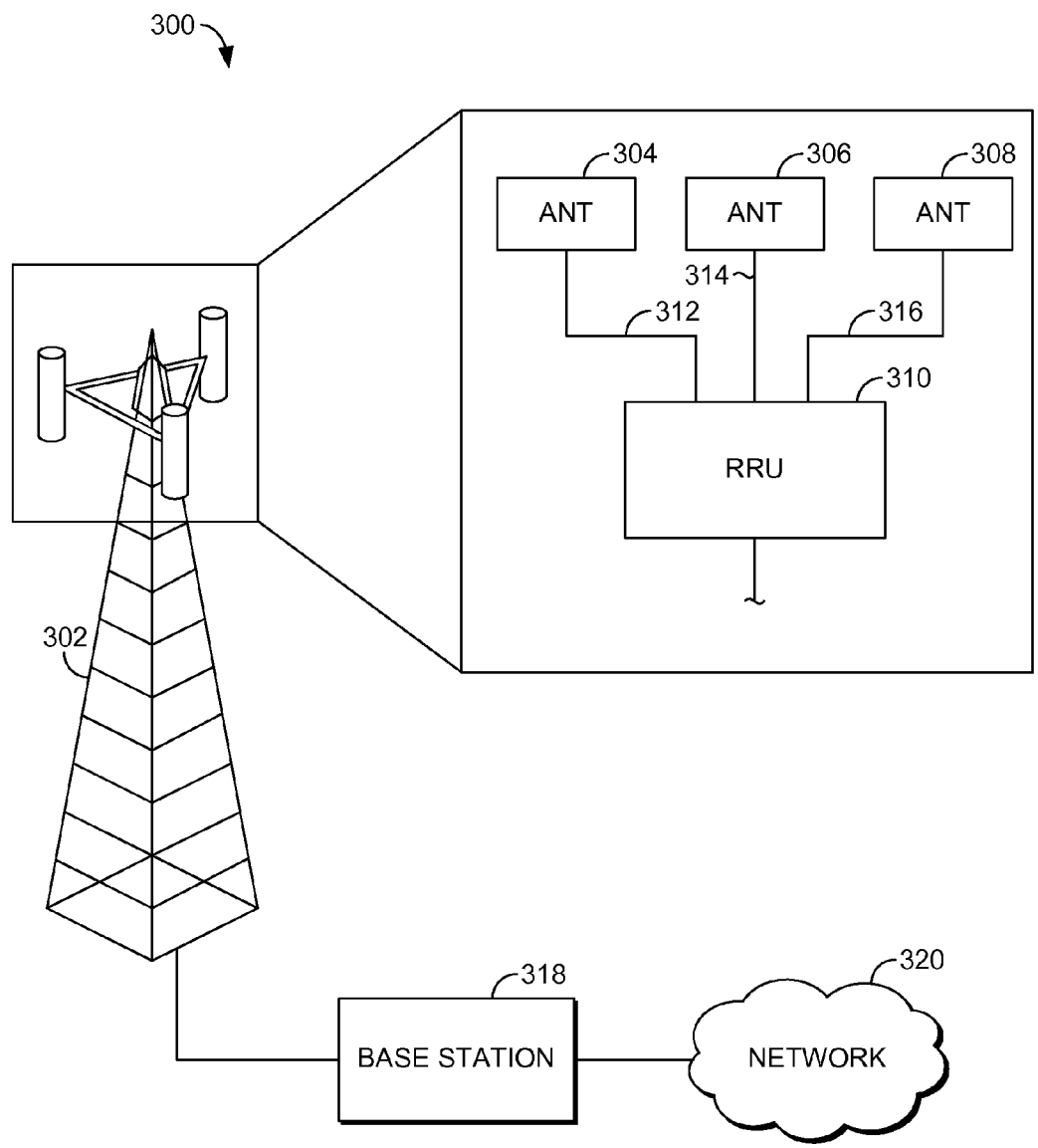
FIG. 3 provides an exemplary schematic of a cell site in accordance with an embodiment of the present invention.

Continuing to FIG. 3, it depicts a detailed schematic of telecommunications equipment 300 located at a cell tower of a cell site, in accordance with embodiments of the invention. Generally, a cell site includes a cell tower 302 including at least one antenna, at least one radio, and at least one cable connector, known as a jumper, that connects the at least one antenna to the radio. As depicted, exemplary cell tower 302 includes a plurality of antennae 304, 306, and 308, each connected to a radio repeater unit 310 through cable connectors such as jumpers 312, 314, and 316. It will be understood by one skilled in the art that the number of antennae, cable connectors, and radios may vary and the schematic depicted in FIG. 3 should not be construed to be limiting. Any number of antennae, cable connectors, and radios may be used at a cell site. The number and size of components may determine the placement and/or configuration of antennae, cable connectors, and radios at a call tower. In some embodiments, components of a first type (e.g. antennae) are spatially separated from components of a second, different type (e.g., radios) within the cell tower. For example, in a cell tower, all of the plurality of antennae 304, 306, and 308 may be located together near the apex of the cell tower whereas all radios are located together some distance (e.g., 10 feet, 15 yards, 500 feet) downward from the apex of the cell tower. Cable connectors such as jumpers 312, 314, and 316 may span, at least partially, a distance between an antenna a radio, such as radio repeater unit 310, in embodiments. The cell tower may further be coupled to a base station 318 such that the cell tower and components therein serve the base station and the network 320 to which the base station 318 is connected, in embodiments. As such, the cell tower 302 serves the exemplary network 320, as shown in FIG. 3. Generally, an antenna, such as each of the plurality of antennae 304, 306, and 308, may be used to communicate radio-frequency signals from a radio, for example, for the purpose of wireless telecommunications over the network 320, for example. The plurality of antennae 304, 306, and 308 may receive radio-frequency signals from mobile devices and/or transmit radio-frequency signals of the radio. In another embodiment, the plurality of antenna 304, 306, and 308 may be associated with a radio in order to transmit and/or receive radio-frequency signals in a frequency band. For example, a frequency band may be a range of frequencies designated (e.g., predetermined or predefined by the International Telecommunication Union, a telecommunications carrier, a governmental entity, etc.) to carry voice data, or non-voice data in a network. In another example, the frequency band may be a range of radio frequencies designated as associated with Third-Generation (3G) or Fourth-Generation (4G) cellular technologies. In embodiments, each of the antennae of the plurality of antennae may transmit and/or receive radio signals at different frequency bands. As such, it is contemplated that each of the plurality of antennae may provide or be fitted so as to provide same, similar, or different transmission capabilities to the cell tower, including frequency bands served and signal power, for example.

The plurality of antennae 304, 306, and 308 are connected to a radio, such as radio repeater unit 310, via cable connectors such as the exemplary jumpers 312, 314, and 316 depicted in FIG. 3. Generally, a radio facilitates communication with a wireless telecommunications network, such as network 320, for example. In some embodiments, a radio might also facilitate other types of wireless communications including Wi-Fi communications and GIS communications. In embodiments, a radio such as the radio repeater unit 310 may include a transmitter and/or a receiver. In addition, the transmitter and receiver may be integrated into a transceiver, in some embodiments.

Figure 4:
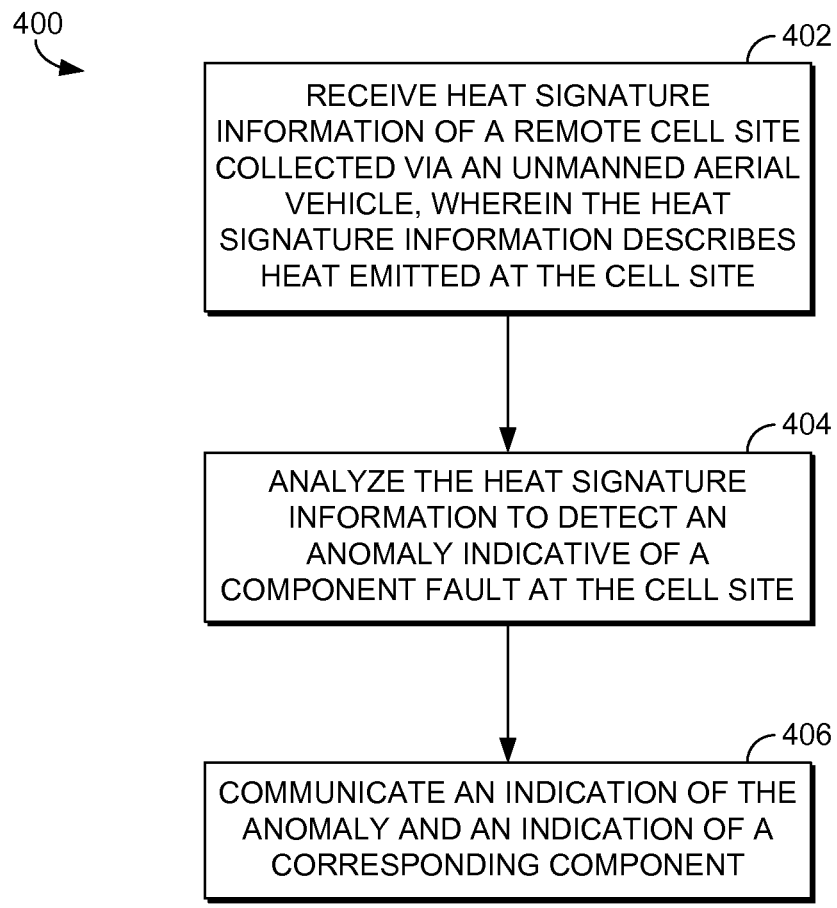
FIG. 4 depicts a flow diagram of an exemplary method for remotely detecting cell site component faults in accordance with an embodiment of the present invention.

Referring to FIG. 4, it depicts a flow diagram of an exemplary method 400 for remotely detecting cell site component faults, according to embodiments of the present invention. At block 402, the method 400 includes receiving heat signature information of a remote cell site collected via an unmanned aerial vehicle. Generally, a cell site refers to a physical location that includes a cell tower for serving a wireless telecommunications network. In one example, a cell site may include a base station, a cell tower, and components of each. Generally, a cell site includes a cell tower having at least one antenna and at least one radio connectively coupled to the at least one antenna, for example, via a cable connector. In some embodiments, the cell site includes one cell tower. In some embodiments, the cell site includes more than one cell tower, where said cell towers are "neighboring" and located within a specified distance of one another. For example, several cell towers may be located within a 5 mile radius of a central and defined location point (e.g., a latitude and longitude, a base station, or a cell tower selected to be said location point), such that the cell towers are considered to constitute a single cell site (e.g., relative to a vast, nationwide and/or global wireless telecommunications network). As such, in some embodiments, a cell site includes a plurality of cell towers that are located near one another and/or are within a specified geographic distance (e.g., a telecommunications carrier may define a distance or radius from a selected point or a chosen cell tower) from one another.

In embodiments, the cell site is remote, meaning that the cell site is located a sizable distance from a city, is located a sizable distance from maintenance services or part supplies, or is located at a geographic or physical location that may be difficult to access (e.g., swamplands, mountainside, and oil rig located in the ocean), or the like. As used herein, a sizable distance is a distance that exceeds a defined distance, generally, as many be defined by a service provider or telecommunications carrier. Generally, the physical location of the cell site may be described as remote with regard to geographic location. For example, a cell site located on a flat, stairway accessible rooftop of a building in New York, N.Y., USA, is not a remote cell site. In another example, a cell site located in the midst of corn fields between Whitney, Nebr., USA, and Chadron, Nebr., USA, is a remote cell site. In yet another example, a cell site located on an oil rig 100 miles off the shoreline of the Gulf of Mexico is a remote cell site. In further examples, a remote cell site may be an off-grid cell site that operates using solar power or wind power, for example, when the cell site is remotely located such that conventional power sources are not available and/or are not feasible. It will be understood by practitioners that a remote cell site may be located closer to a metropolitan area, however, environmental factors or placement may render the cell site to be considered remote for the purposes of this application. For example, a cell site located on the forested slopes of Mount Fuji may be considered a remote cell site albeit Mount Fuji is located only approximately 62 miles (100 kilometers) from the city of Tokyo, Japan's capital and largest city. Accessing remote cell sites may therefore be difficult and may make collection of information regarding the remote cell sites expensive for service providers and/or dangerous to human workers.

Accordingly, the heat signature information received may be measured, collected, and/or observed using a UAV. The UAV, being aerial, has the capability to fly around a remote cell site including a cell tower. The UAV is generally equipped to collect and record heat signature information of a remote cell site, using a camera and/or other sensors. Exemplary cameras may include thermal cameras such as infrared cameras. A thermal camera may be used in tandem with a conventional camera (e.g., color image camera), such that thermal images of a cell site may be used with, or overlaid with, conventional images of the cell site in order to align temperature readings as localized at and/or within a cell tower at the cell site, for example. Accordingly, the UAV may include equipment (e.g., mechanical, hardware, and/or software) that enable the UAV to detect and record heat signature information (e.g., temperature readings) at the cell site.

Heat signature information indicates an amount of heat emitted at the remote cell site, generally. An amount of heat may be measured in terms of temperature (e.g., Fahrenheit, Celsius) and/or energy (e.g., Joules), in embodiments. Heat may generally refer to an amount of released energy or energy that is "given off." Heat signature information may include one or more of the following: a temperature reading (e.g., measurement) of the overall temperature of all components of a cell site, an aggregated temperature of a cell site, an average temperature of a cell site, a temperature reading of each individual component at the cell site, a temperature reading of all antennae of the cell site, a temperature reading of all radios of the cell site, a temperature reading of all cable connections at the cell site, a temperature reading of a coupling of cable connectors to one or more antennae, a temperature reading of a coupling of cable connectors to one or more radios, an average temperature reading of a plurality of antennae, an average temperature reading of a plurality of radios, an average temperature reading of antenna-cable connector couplings, an average temperature reading of radio-cable connector coupling, and the like. As the resolution of thermal imaging increases, the UAV equipment may detect heat signature information with increased levels of detail that enables detailed localization of heat emissions and more precise heat measurements. Generally, the term "signature" is used herein to denote heat information that is specific to a single cell site or is detected with respect to a single cell site, in embodiments. For example, the heat signature information of a first cell site is not the same at the heat signature information of a second cell site where the first cell site and the second cell site include different components or are located in different climates. In such an example, factors such as component model, component type, manufacturer, age of a component, and wear and tear due to environmental factors may affect the heat signature information of each of the first cell site and the second cell site such that the heat signature information of each cell site is clearly distinguishable from one another. In further embodiments, each cell site may have a corresponding heat signature information that uniquely identifies the cell site. In this way, heat signature information may be used to identify a cell site, identify specific components at a cell site, identify a region (e.g., state, climate type, climate zone) where the cell site is located, and the like, in further embodiments. For example, a first cell site located in a boreal forest region of northern Canada and observed by a UAV in July may have a very different heat signature than a second cell site located in the Sonoran desert in the southern United States and observed by a UAV in July, as each location experiences different atmospheric levels of temperature and humidity.

Generally, a UAV may be instructed (e.g., via computer-readable instructions) to collect and record information from a specified or selected remote cell site. Such instructions may be received by the UAV over a wireless network. The instructions may include one or more of the following: specific location coordinates of a cell site (e.g., longitude and latitude coordinates, Global Positioning System (GPS) coordinates); an area defined by a polygon corresponding to a remote cell site; one or more flight patterns to use in an inspection of one or more cell sites; one or more elevations at which to record heat signatures of a remote cell site; a date, time (e.g., 9:00 a.m. local time, on the second Tuesday of each month), or time interval (e.g., between the hours of 1:00 a.m. and 3:00 a.m. local time) in which to detect and record heat signatures; and a periodicity to inspect a cell tower (e.g., once-a-month inspection). It will be understood that the exemplary instructions described may be tailored specifically to a single cell site, or, may be generic, applying to more than one cell site. In one example, the shape and height of a cell tower structure of a cell site may determine a flight pattern to be provided in instructions for a UAV. Additionally, a UAV may receive instructions to record initial or baseline heat signature information of a cell site at night, when traffic load at the cell site may be predicted to be at a minimum. Such heat signature information may be analyzed to identify lower limits of heat thresholds for one or more components, for example. In another example, a UAV may have instructions to record peak heat signature data of a cell site at a time and/or date where traffic load of the cell site is predicted or known to be the highest. The UAV may therefore collect heat signature information that indicates heat amounts at a cell site during the highest traffic load. Such heat signature information may be analyzed to examine performance of components of the cell site during heavy traffic loads and optimize the performance of said components during heavy traffic loads.

An area for the UAV to inspect may be defined as a polygon (e.g., regular or irregular) surrounding a cell site or defined by a range of one or more cell towers at the cell site, in embodiments. In some embodiments, the UAV may be assigned or have a designated cell site such that the same UAV always or almost always inspects the same cell site, and in this way, inconsistencies in heat signature information that may result from the use of different UAVs (e.g., and different UAV equipment) may be prevented in the collection of heat signature information for a cell site. The UAV may perform tasks specified in the instructions regarding the detection and collection of a heat signature of a cell site. The UAV may therefore use thermal imaging to inspect a cell site and the function and performance of components operating at said cell site.

In embodiments, the UAV may wirelessly transmit the collected heat signature information to a computing device via a telecommunications network, for example. In some embodiments, the UAV is communicatively coupled to a computing device over a wireless network. The UAV may transmit the heat signature information such that a computing device may stream the information from the UAV, in some embodiments.

Continuing, the method 400 includes, at block 404, analyzing the heat signature information to detect an anomaly indicative of a component fault at the remote cell site. Analyzing the heat signature information may include identifying one or more components of a cell site. Analyzing the heat signature information may include identifying individual components at the cell site, in embodiments. For example, a first component may be identified as separate and distinct from a second component based on location and/or heat measurements via analysis. Analyzing the heat signature information may include identifying a type of component. Examples of component types include an antenna, radio, or connector cable, although further components not listed herein are considered to be within the scope of this disclosure. For example, a first component may be identified and categorized as an antenna based on the location of the component at the cell tower and/or a heat measurement corresponding to the first component that is associated with an antenna component type. In a further example, heat signature information specific to (e.g., corresponding to) a first component categorized as an antenna may be stored in a database for later or subsequent analysis of the same cell site including the first component.

In embodiments, identifying a type of component via the analysis may include references to other heat signature information and comparisons to other heat signature information such as: previously observed heat signature information from the same cell site; heat signature information from a cell site having the same or similar components; heat signature information from a cell site that experiences similar environmental factors; heat signature information from one or more neighboring cell sites; heat signature information from a database; heat signature information corresponding to the same or similar components at one or more cell sites; heat signature information extrapolated from manufacturer recommendations; heat signature information determined from operating specifications for a particular component; other heat signature information predictions based on previously observed other heat signature information patterns of one or more cell sites; and the like. Previously observed or collected heat signature information may be referred to as historical heat signature information, in embodiments.

For example, a cable connector may have an expected heat signature that is not the same as the expected heat signature of a radio. A radio at a cell site is configured to allow the escape of heat generated during operation of the radio in order to maintain performance standards of the radio component by preventing the radio from overheating, for example. In contrast, a cable connector that is properly functioning may not emit a large amount of heat or a level of heat that is low relative to heat emissions from a functional radio, for example. As such, a fully functioning radio is distinguishable from a fully functioning cable connector in a thermal image. Further, analyzing the heat signature information may include identifying a component type for each detected individual component of a cell site and categorizing each individual component. For example, a first component may be identified and categorized as an antenna based on the location of the component at the cell tower and/or a heat measurement associated therewith. Further, the antenna type, the location within a cell tower, and a heat measurement associated with first component may be stored for later reference and analysis of the same cell site.

The heat signature information may be analyzed in any number and combination of ways in order to detect an anomaly that is indicative of a component fault at the remote cell site. An anomaly generally refers to an amount of heat (e.g., a temperature measurement) that is outside of predefined heat signature information or does not correspond to a standard heat signature. For the purposes of this disclosure, a standard heat signature may refer to predefined or predetermined heat signature information that is indicative of normal functioning and normal performance of one or more components of a cell site. An anomaly may refer to a heat measurement that is outside of a normal operating heat range or otherwise indicates that a component may be failing to function or operate normally. Normal, as used herein, may refer to expected functions of a component or operation of a component within defined technical specifications, for example. An anomaly may include one or more of an amount of heat (e.g., a heat measurement) that indicates one or more of a degraded antenna signal, impairment of radio function, and heat escape located proximate to a cable connector. As used herein, heat escape located proximate to a cable connector refers to a connection point wherein a cable connector is coupled to an antenna or a radio. An anomaly may be indicated when the amount of heat detected at the cell site is: outside of a predefined temperature, outside of a range of temperatures, at or above a heat or temperature threshold, at or below a heat or temperature threshold, at a heat or temperature upper limit, below a heat or temperature lower limit, or within a specific range of temperatures bordering a temperature threshold, etc. The predefined heat signature may be specific to a component type (e.g., an antenna may have a different predefined heat signature than a radio), in embodiments. The predefined heat signature may be predetermined based on manufacturer recommendations, field-based observations of engineers and technicians, and/or environmental factors (e.g., climate), in embodiments. The predefined heat signature may be based on one or more previously collected heat signatures specific to the cell site, and further previously recorded heat signature information of the same components at the cell site, in some embodiments.

In one example, a radio may be considered to be operating properly (e.g., fully functional and at peak performance) when heat is dissipated from the radio at a first rate, wherein the radio is designed and configured to dissipate the heat so as to cool the radio during operation. When heat is not dissipated at or above the specific first rate, the radio may have an increased likelihood of overheating and malfunctioning, and thus, radio performance and function may be impaired. The UAV collects heat signature information through thermal imaging of the cell site including the radio. The heat signature information of the radio may be analyzed to determine if the radio is experiencing heat dissipation at the first rate, in this example. As such, when the analysis finds a level or amount of heat dissipation is at or near the first rate, an anomaly is not detected. In contrast, when the analysis reveals a heat dissipation rate that is not at or near the first rate, an anomaly may be detected that indicates a component fault of the particular radio.

Similarly, in another example, a radio may be considered to be operating properly (e.g., fully functional and at peak performance) when the radio operates at temperatures between a first temperature, expressed in degrees Fahrenheit, for example. In such an example, when the analysis identifies that the radio has an operating temperature that is between the first and second temperatures in degrees Fahrenheit, an anomaly is not detected. And when the analysis identifies that the radio has an operating temperature that is below the first temperature or above the second temperature in degrees Fahrenheit, an anomaly is detected that indicates the radio may have increased likelihood of impaired functioning such that there may be a component fault at the radio.

In yet another example, an antenna may be considered to be operating properly (e.g., fully functional and at peak performance) when the antenna emits heat at or around a third temperature, expressed in degrees Celsius. When an antenna is not operating correctly, the antenna may appear cool in thermal imaging, as heat is a byproduct of the antenna's normal or standard operation. The UAV collects heat signature information through thermal imaging of the cell site including the antenna. In this example, when the analysis identifies that the antenna has an operating temperature at or above the third temperature, an anomaly is not detected. And when the analysis identifies that the antenna has an operating temperature at or below the third temperature, an anomaly is detected that indicates an increased likelihood of impaired performance of the antenna, such that there may be a component fault at the antenna.

In another example, a cable connector (e.g., a jumper) may be considered to be operating properly (e.g., fully functional and at peak performance) when no heat, a small amount of heat, a negligible amount of heat, or an amount of heat below a predefined amount is detected where the cable connector is coupled to an antenna or a radio. When a connection point of a cable connector is not operating correctly, heat may be reflected back or emitted at or near the connection point, which suggests tightening of the connection may be needed. As such, when a UAV collects heat signature information through thermal imaging of the cell site including the cable connector, the heat signature regarding the cable connector may be analyzed to identify an anomaly that indicates a component fault that includes heat reflection at a connection point of a cable connector and an antenna or a radio, for example.

It will be understood that the illustrative examples described herein should not be construed as limiting in terms of heat rates or temperatures, as said measurements may be defined or determined in any number of ways, including based on component type, model number, manufacturer, carrier or engineer preferences, climate of a cell site, cell site traffic load, and other considerations not listed herein for brevity but that will be understood to be considered by practitioners in the art.

An anomaly indicative of a component fault may be detected using previously collected heat signature information (e.g., historical heat signature information) that is specific to the cell site and/or a particular component of the cell site. In some embodiments, anomaly detection includes referencing a heat map that is specific to the remote cell site. A heat map, as referred to herein, may generally describe historical heat signature information for one or more components of the remote cell site. The heat map may include separate and distinct heat measurements for each individual component at a cell site. The heat map may include a heat measurement of at least one antenna, at least one radio, and at least one cable connector that were collected previously in time, in some embodiments. The heat map may include a series of heat measurements taken over a period of time, in another embodiment. A heat map may include an average heat measurement for one or more components of a cell site based on multiple aerial inspections performed by a UAV. A heat map may be a composite heat map of the remote cell site that indicates heat measurement patterns for one or more components of the cell site such that the composite reveals information regarding heat measurements that indicate traffic load, time of day, day of the year, and other factors, in some embodiments. For example, the heat map may include heat signature information collected only in the month of May, or all heat signature information collected in the previous three months, or the previous five years. In another example, the heat map might include previously collected heat signature information specific to the same antenna in the cell site, specific to a plurality of antennae at the same cell site, specific to one or more radios of neighboring cell sites, and the like. In embodiments, a database includes a plurality of heat maps for each remote cell site in a region or in a telecommunications network. In one embodiment, analysis includes mapping the heat signature information to at least one heat map specific to the remote cell site. In some embodiments, a remote cell site does not have a corresponding heat map for reference or mapping, and as such, newly collected heat signature information may be stored as a heat map for future reference. In this way, a heat map of a remote cell site may be created and updated on an on-going basis. An anomaly indicative of a component fault may therefore be detected by referencing a heat map specific to the remote cell site.

An anomaly generally refers to an amount of heat outside of predefined heat signature information, and as such, an anomaly indicates an increased likelihood of a component fault. As used herein, a component fault refers to impaired functioning of a component at a cell tower. Impaired functioning may include complete or partial malfunctioning, reduced functioning, erratic or intermittent functioning, and the like. The performance of the component may be impaired such that one or more functions of the component may be improved with maintenance (e.g., repaired, replaced, or reconfigured), for instance. The impaired functioning may refer to mechanical, hardware, and/or software impairment. Such reduced functionality or impaired performance of a component may be caused by damage, wear and tear, and/or an expected lifespan of a component (e.g., based on a warranty, hardware specifications, and/or manufacturer recommendations).

Upon detecting the anomaly, the method 400 continues with communicating an indication of the anomaly and an identification of a corresponding component, shown at block 406. As illustrated by the previous examples, the heat signature information corresponding to each of an antenna, a radio, and a cable connector may be utilized to differentiate each component from one another and therefore identify each component. In embodiments, antennae, radios, and cable connectors may be spatially separated at a cell tower, as well. The difference in heat signatures and/or placement of components at a cell site may be used to facilitate the specific identification of one or more individual components exhibiting an anomaly. An indication of the anomaly and an identification of the corresponding component may be communicated to a controller via the network. Further, in embodiments, the indication of the anomaly and the identification of a corresponding component may be stored in a database. For example, the indication and/or the identification may be recorded, separately or together, in a log of anomalies, may be used to mark or tag a component as needing further inspection or observation, may include an alert or alarm that indicates maintenance such as replacement of said component, and the like.

In some embodiments, the method 400 includes determining whether to undertake a maintenance action at the remote cell site when the anomaly is detected, based on the analysis. Said determination may be made manually by a technician or engineer, or alternatively, said determination may be made by a machine such as a computing device including a controller, in embodiments. In some embodiments, a maintenance action includes activating a component, inactivating a component, and/or reactivating a component. A maintenance action may be performed by an engineer or cell tower technician, in some embodiments. In other embodiments, a maintenance action may be performed remotely via the network using a computing device to activate an inactive component, inactivate a component, and/or reactivate a component. Reactivating a component may include rebooting or resetting a component, for example. In another example, a maintenance action includes inactivating a malfunctioning component and activating a previously inactive component. In this way, dormant, redundant components may be installed at a remote cell site during construction and activated later, on an as-needed basis. In this way, a human worker is no longer required to climb a cell tower.

Figure 5:
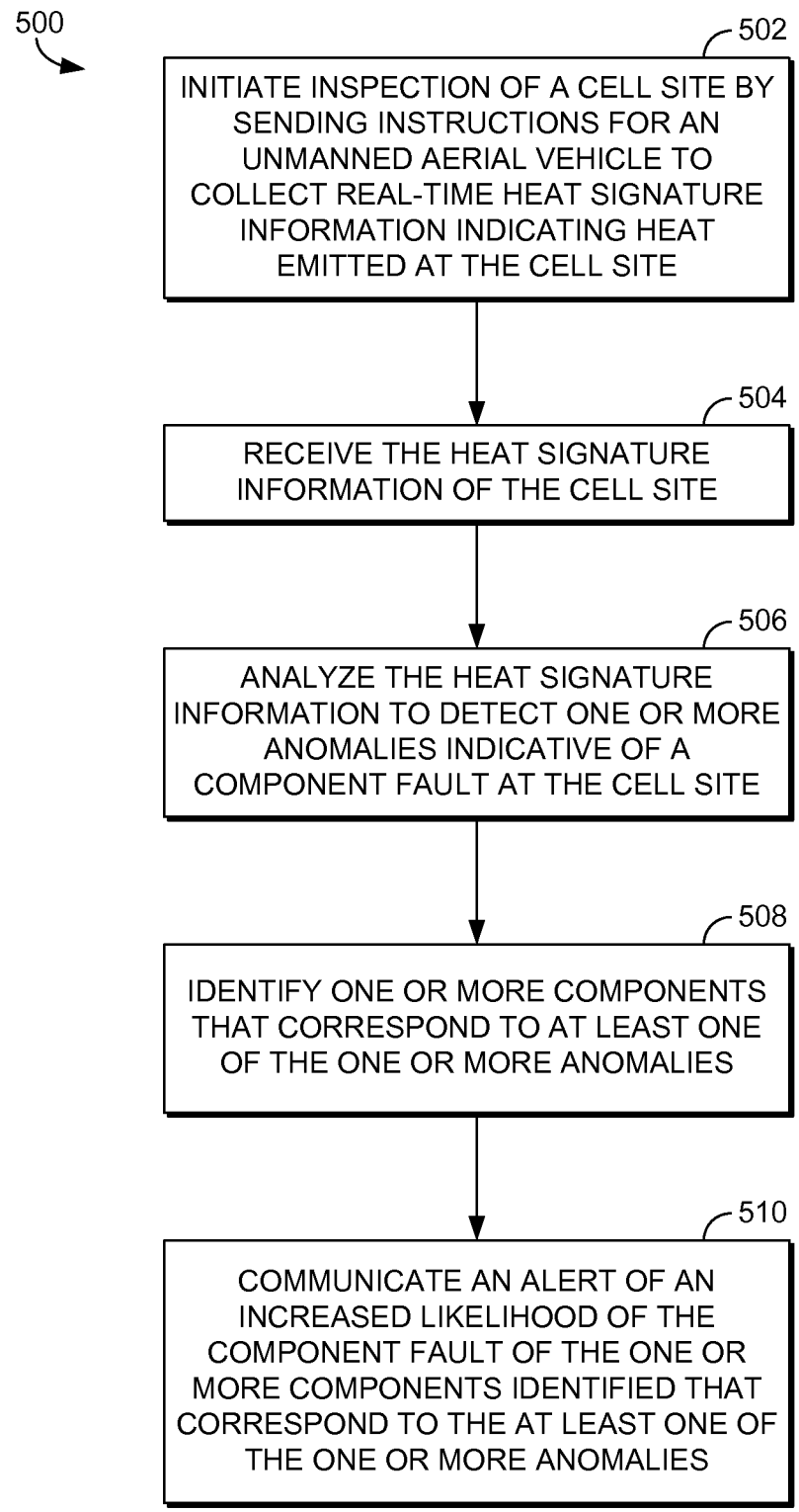
FIG. 5 provides a flow diagram illustrating an exemplary method for remotely detecting cell site component faults in accordance with an embodiment of the present invention.

FIG. 5 provides a flow diagram illustrating an exemplary method 500 for detecting cell site component faults, according to embodiments of the present invention. The method 500 may be implemented using one or more computer-readable storage media having computer-executable instructions embodied thereon that, when executed, perform said method. At block 502, the method 500 includes initiating inspection of a cell site by sending instructions for an UAV to collect real-time heat signature information that indicates an amount of heat emitted at the cell site. Initiating inspection of a cell site may be triggered manually by a technician that is remotely located from the cell site, in some embodiments. In some embodiments, in response to an indication that network service provided by a cell site is negatively impacted, inspection of the cell site may be triggered. An indication of affected network service might be a notification (e.g., text message, phone call, or other self-reporting method) from a network user and/or an alert issued by network devices that monitor network service and network component performance. In embodiments, initiating inspection of a cell site may be performed on demand, periodically, in response to an indication of reduced cellular service performance, or based on an estimated component lifespan, for example. In embodiments, initiating inspection of a cell site may be automatically triggered by components at the cell site, or components on the backend of the network, for example, a server or other computing device.

At block 504, the method 500 includes receiving the heat signature information of the cell site. The heat signature information may be received by a computing device that is remote from the cell site, via the network. The method 500 continues at block 506 and includes analyzing the heat signature information to detect one or more anomalies indicative of a component fault at the cell site. In some embodiments, the one or more anomalies may include: a heat measurement indicating a degraded antenna signal; a heat measurement indicating radio impairment; and/or a heat measurement indicating heat escape located proximate to a cable connector. And in further embodiments, analyzing the heat signature information may include one or more of: determining an amount of signal degradation of an antenna; determining an amount of heat retention of a radio; and/or determining an amount of heat emission of a cable connector, for example.

In further embodiments, the method 500 may include referencing at least one heat map stored in a database. The heat map may include, in some embodiments, predefined heat signature information that describes an operating temperature of one or more components. Additionally, the heat map may be specific to the remote cell site, a neighboring cell site, a plurality of cells cites, a plurality of neighboring cells sites, or specific to a manufacturer, etc.

In embodiments, the method 500 includes identifying one or more components that correspond to at least one of the one or more anomalies, depicted at block 508. And in some embodiments, the method 500 further includes identifying a first anomaly that corresponds to a first component, where the first anomaly includes a heat measurement outside of a first predefined operating temperature for the first component. The first component may be an antenna, a radio, or a cable connector, for example. And, the method 500 includes communicating an alert of an increased likelihood of the component fault of the one or more components identified that correspond to the at least one of the one or more anomalies, shown at block 510.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for remotely detecting cell site component faults, the method comprising:
    receiving heat signature information of a remote cell site collected via an unmanned aerial vehicle, wherein the heat signature information indicates an amount of heat emitted by one or more components at the remote cell site;
    referencing a heat map specific to the remote cell site, wherein the heat map describes historical heat signature information for the remote cell site;
    analyzing the heat signature information to detect an anomaly indicative of a component fault at the remote cell site based on the heat map, wherein the component fault indicates an increased likelihood of impaired functioning of a corresponding component;
    upon detecting the anomaly, communicating an indication of the anomaly, an identification of the corresponding component, and an indication of a maintenance action, wherein the maintenance action includes one or more of activating a component, inactivating a component, and reactivating a component.

2. The method of claim 1,
    wherein the historical heat signature information describes heat emitted by the for one or more components of the remote cell site including at least one of an antenna, a radio, or a cable connector, and wherein the historical heat signature information indicates a previously detected amount of heat emitted at the remote cell site.

3. The method of claim 2, further comprising:
    updating the heat map specific to the remote cell site to reflect the analysis of the heat signature information.

4. The method of claim 1, wherein the one or more anomalies include a heat measurement indicating one or more of a degraded antenna signal, a heat measurement indicating a radio impairment, and a heat measurement indicating heat escape that is physically located proximate to a cable connector.

5. The method of claim 1, further comprising:
    storing the indication of the anomaly and the identification of a corresponding component in a database.

6. The method of claim 1, wherein analyzing the heat signature information to detect an anomaly indicative of a component fault at the remote cell site further comprises:
    mapping the heat signature information to at least one heat map specific to the remote cell site.

7. One or more non-transitory computer-readable storage media having computer-executable instructions embodied thereon that, when executed, perform a method for detecting cell site component faults, the method comprising:
    initiating inspection of a cell site by sending instructions for an unmanned aerial vehicle to collect real-time heat signature information that indicates an operating temperature of one or more components at the cell site;

receiving the heat signature information of the one or more components at the cell site;

reference a heat map, wherein the heat map describes operating temperatures of the one or more components;

analyzing the heat signature information to detect one or more anomalies indicative of a component fault of the one or more components at the cell site;

identifying at least one component of the one or more components that corresponds to at least one of the one or more anomalies; and communicating, to a service provider, an alert of an increased likelihood of the component fault of the at least one component identified that corresponds to the at least one of the one or more anomalies.

8. The media of claim 7, wherein analyzing the heat signature information further includes:

referencing at least one heat map stored in a database, the at least one heat map including predefined heat signature information describing an operating temperature of one or more components.

9. The media of claim 7, wherein analyzing the heat signature information further includes:

identifying a first anomaly corresponding to a first component having a heat measurement outside of a first predefined operating temperature, wherein the first component is an antenna, a radio, or a cable connector.

10. The media of claim 7, further comprising:

storing the heat signature information collected in a database.

11. The media of claim 7, wherein the one or more anomalies include one or more of a heat measurement indicating a degraded antenna signal, a heat measurement indicating a radio impairment, and a heat measurement indicating heat escape located proximate to a cable connector.

12. The media of claim 7, wherein analyzing the heat signature information includes one or more of:

determining an amount of signal degradation of an antenna;

determining an amount of heat retention of a radio; and determining an amount of heat emission of a cable connector.

13. The media of claim 7, wherein initiating inspection of a cell site is performed on demand, periodically, in response to an indication of reduced cellular service performance, or based on an estimated component lifespan.

14. A system for detecting a component fault at a remote cell site, the system comprising:

one or more processors; and a controller configured to:

receive heat signature information of a remote cell site collected using an unmanned aerial vehicle, wherein the heat signature information indicates an amount of heat emitted by one or more components at the remote cell site;

reference a heat map stored in a database, wherein the heat map describes operating temperatures of the one or more components;

analyze the heat signature information to detect an anomaly indicative of a component fault of the one or more components at the remote cell site based on the heat map; and when an anomaly is detected, communicate one or more of an indication of the anomaly or an indication of a maintenance action to a service provider.

15. The system of claim 14, further comprising:

a database configured to store a plurality of heat maps that describe heat emitted at a plurality of cell sites.

16. The system of claim 14, wherein the controller is further configured to:

identify a first anomaly corresponding to a first component having a heat measurement outside of a defined operating temperature, wherein the first component is an antenna, a radio, or a cable connector physically located at the cell site.

17. The system of claim 14, wherein the maintenance action communicated identifies a component fault corresponding to at least one component having a likelihood of impaired function which the maintenance action rectifies.

\* \* \* \* \*